United States Patent Office 3,583,877
Patented June 8, 1971

3,583,877
METHOD OF TREATING BASIC DYES
Carl Rosenblum, West Orange, and Seymour Broad, Belleville, N.J., assignors to Tenneco Chemicals, Inc.
No Drawing. Filed Apr. 10, 1968, Ser. No. 720,378
Int. Cl. C08h 17/02; C09b 67/00
U.S. Cl. 106—288Q                                  1 Claim

ABSTRACT OF THE DISCLOSURE

Pellets of basic dyes are prepared by compressing the finely-divided dye to which have been added small amounts of immiscible materials, at least one of which is a solvent for the dye and at least one of which is a non-solvent for the dye, and optionally a dispersing agent. These pellets, which are clean and free from dust, are readily dispersed in the vehicles that are used in the manufacture of hectograph inks and other printing inks.

---

This invention relates to a method of treating dyes. More particularly, it relates to a method of treating finely-divided basic dyes so as to form products that are free of dust and that are readily incorporated into printing ink and other formulations.

The powdered dyes that are produced commercially generally contain sizeable amounts of very finely-divided particles. These particles, which readily become airborne during handling, constitute a health hazard as well as being a nuisance in that the spreading dust causes soiling of walls, floors, clothing, and papers on which it settles and in that it may cause contamination of materials stored or used in the area.

Many attempts have been made to inhibit the formation of very finely-divided particles of dyes and to prevent their spreading, but none has proven to be entirely satisfactory. Elaborate dust collecting systems that have been devised to prevent the escape of the dust are costly and are often ineffective. The treatment of the dyes with oils, waxes, and greases to reduce dusting has been unsuccessful because the crystals are usually not uniformly coated and because the coated crystals tend to break when they are handled to again cause dusting. In addition, this treatment requires the use of relatively large amounts of additives whose presence is often undesirable in compositions in which the dyes are used. The compacting of the finely-divided particles in the absence of additives has not proven satisfactory because excessive pressure is required and the aggregates so formed do not disintegrate readily when they are mixed with the vehicles that are used in the manufacture of inks and other compositions.

In accordance with the present invention, it has been found that products that contain little or no dust, that can be handled without appreciable dust formation, that are uniform in composition, and that are readily dispersed when they are agitated or milled with an ink vehicle, can be prepared by mixing a powdered dye or pigment with small amounts of immiscible materials, at least one of which is a solvent for the dye or pigment and at least one of which is not a solvent for the dye or pigment, and subjecting the resulting mixture to sufficient pressure to form an agglomerated or pelleted product and to cause the non-solvent to exude to the surface of the pellets. The products prepared in this way, which are pellets of the dye or pigment that are coated with a uniform thin layer of the non-solvent material, have a higher density than the untreated materials, and have a lubricated surface that substantially improves their handling characteristics.

Any of the commonly used powdered dyes and pigments can be treated in accordance with the process of this invention to form products having improved physical form. The invention is of particular value in the treatment of basic dyes which because of their water solubility, their exceptional brightness, and their high tinctorial strength cause particularly serious handling problems. As used herein, the term "basic dyes" refers to cationic dyes that contain substituted or unsubstituted amino or imino groups which cause the dyes to function as positive ions in dilute acid solution and includes the following groups of dyes: diarylmethane and triarylmethane dyes, azo dyes, xanthene dyes, diarylketonimine dyes, azine and thiazine dyes, oxazine dyes, polymethine and cyanine dyes. Illustrated of these basic dyes are the following: Crystal Violet (CI Basic Violet 3), Acridine Orange N (CI Basic Orange 14), Rhodamine B (CI Basic Violet 10), Auramine (CI Basic Yellow 2), Safranine (CI Basic Red 2), Methylene Blue (CI Basic Blue 9), Nile Blue A (CI Basic Blue 12), and Astra Phloxine 5 G (CI Basic Orange 10). The free organic bases; such salts as the chlorides, acetates, oxalates, sulfates, and the zinc chloride double salts; or mixtures of the free bases and salts may be treated in accordance with the process of this invention.

Only small amounts of the additives need be added to the powdered dyes that are to be densified by the process of this invention to bring about the aforementioned improvements in their physical form and dispersability. The addition of as little as about 0.1 percent by weight of the solvent and about 0.1 percent by weight of the non-solvent prior to the compacting of the dye will generally result in the formation of dust-free pellets. Ten percent or more of each of the additives may be used, but no particular advantage arises from the use of these larger amounts. It is generally preferred that the composition contain about 0.5 percent to 2.5 percent by weight of at least one solvent for the dye and about 0.5 percent to 2.5 percent by weight of at least one material in which the dye is not completely soluble.

A wide variety of materials in which the dyes are soluble can be used in the practice of this invention. These include, for example, water; alcohols such as methanol, ethanol, isopropanol, and amyl alcohol; ketones such as acetone and methyl ethyl ketone; ethers such as dioxane and diethyl ether; and esters including vegetable oils such as linseed oil, soybean oil, and castor oil. Castor oil and water are generally the preferred solvents. Either a single solvent or a mixture of two or more of these materials can be used in the practice of this invention. If the dye or pigment contains more than about 0.5 percent of water, additional solvent need not be added prior to the compacting step since the water present will tend under pressure to perform the necessary cementing action.

The dye compositions of this invention also contain materials that are immiscible with the aforementioned solvents, that are not solvents for the dyes, and that have low volatility. This group of materials includes mineral oils, resins, and waxes. Illustrative of these materials are mineral oil, paraffin wax, montan wax, carnauba wax, tallow, beeswax, rosin, polymerized rosin, rosin esters, shellac, copals, alkyd resins, phenolformaldehyde resins, coumarone-indene resins, and the like. Solid waxes and resins may be added as such to the dyes, or they may be added as solutions in either volatile or non-volatile solvents. When volatile solvents are used, they may if desired be removed from the dye compositions either before or after the compacting step.

If products having the desired physical form and dispersability are to be obtained, the dye composition that is to be compacted must contain both of the aforementioned types of additives. When the dye composition contains as additive only a non-solvent, such as an oil or wax, the pellets formed are usually not uniformly coated and when they are handled they tend to break and become dusty. When no additive is used and when only a solvent is added to the dye, the pelleted materials are not readily broken up and dispersed in the vehicles used in the preparation of printing inks.

The dispersability of the pelleted materials in printing ink vehicles can be further improved by including in the additive mixture about 0.1 percent to 1 percent, and preferably 0.2 percent to 0.5 percent, based on the weight of the composition, of a dispersing agent such as lecithin, oxidized paraffin wax, asphaltic materials, and fatty alcohol sulfates.

The compacting of the powdered dye is carried out by subjecting the dye containing the aforementioned additives for a brief period of time to sufficient pressure to cause the finely-divided particles to agglomerate and the non-solvent to exude to the surface of the resulting pellets.

Any commercially available compacting equipment can be used to agglomerate and densify the dye. The compacting equipment may be, for example, a rotary press, a roller mill, a compacting mill, a molding press, or a pellet mill.

Since the force that is subsequently required to cause the pellets to disintegrate is directly related to the pressure used in forming them, the compacting step is generally carried out at the minimum pressure that will bring about the desired agglomeration and coating of the particles. In most cases, a pressure in the range of about 50 p.s.i. to about 50,000 p.s.i. is used, with particularly satisfactory results being obtained when the powdered dye containing the aforementioned additives is subjected to pressures in the range of 100 p.s.i. to 15,000 p.s.i.

The temperature at which the densification is effected is not critical. For convenience, the process is generally carried out at room temperature; higher temperatures can be used without affecting the results provided that they are not sufficiently high to cause the dye to decompose.

The invention is further illustrated by the examples that follow. In these examples, all parts are parts by weight.

EXAMPLE 1

A series of experiments was carried out in which Crystal Violet powder was compacted in molds at pressures of 100 p.s.i., 500 p.s.i., and 1000 p.s.i. using a Carver Laboratory Press. The Crystal Violet composition used in Example 1A contained 0.5 percent by weight of mineral oil and 0.5 percent by weight of castor oil, while that used in Example 1B contained 0.5 percent by weight of mineral oil, 0.5 percent by weight of castor oil, and 0.2 percent by weight of lecithin. For comparative purposes, a dye composition that contained no additives was also compacted. The pressure required to break each of the pellets was then measured.

The results obtained are summarized in the Table I.

TABLE I

|  | Example No. |  | Comparative example |
|---|---|---|---|
|  | 1A | 1B |  |
| Composition (parts): |  |  |  |
| Crystal Violet Powder | 99.0 | 98.0 | 100 |
| Mineral oil | 0.5 | 0.5 |  |
| Castor oil | 0.5 | 0.5 |  |
| Lecithin |  | 0.2 |  |
| Appearance of pellets | (1) | (1) | (2) |
| Breaking point of pellets (grams): |  |  |  |
| Formed at 100 p.s.i. | 600 | 300 | 300 |
| Formed at 500 p.s.i. | 3,600 | 3,000 | 2,600 |
| Formed at 1,000 p.s.i. | 8,000 | 5,300 | 5,000 |

1 Clean, coated hard pellets.
2 Dusty hard pellets.

EXAMPLE 2

Pellets were prepared by compacting dye compositions of this invention and a comparative composition in molds at a pressure of 500 p.s.i. using a Carver Laboratory Press.

The dispersability of the pelleted compositions was determined by placing the pellets in mineral oil that was maintained at 70° C. and agitated by an electric stirrer at approximately 240 r.p.m. and measuring the time required for the pellets to disintegrate.

The dye compositions used and the time required for the pellets prepared from each of these compositions to disintegrate are set forth in Table II.

TABLE II

|  | Example No. |  | Comparative example |
|---|---|---|---|
|  | 2A | 2B |  |
| Composition (parts): |  |  |  |
| Crystal Violet Powder | 95.0 | 95.0 | 100.0 |
| Mineral oil | 2.5 | 2.45 |  |
| Castor oil | 2.5 | 2.45 |  |
| Lecithin |  | 0.10 |  |
| Time required for disintegration in mineral oil at 70° C. (minutes) | 6 | 5 | 20 |

EXAMPLE 3

A dye composition was prepared by mixing 97 parts of Crystal Violet Powder with 1.5 parts of mineral oil and 1.5 parts of castor oil. The composition was placed in a commercial briquetting machine and 15,000 pounds pressure was applied to the composition to form 1.5″ x 1.5″ x 1″ briquettes. These briquettes were hard and dust-free and did not break during handling.

When pure Crystal Violet Powder was used in the briquetting machine, satisfactory briquettes were not obtained even when 30,000 pounds pressure was applied to the powder.

The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:
1. The process for the preparation of substantially dust-free compositions that comprises the following steps:
   (A) Forming a mixture comprising:
      (i) a powdered basic dye,
      (ii) 0.5 percent to 2.5 percent by weight of castor oil,
      (iii) 0.5 percent to 2.5 percent by weight of mineral oil, and
      (iv) 0.1 percent to 1 percent by weight of lecithin; and
   (B) Compressing said mixture at a pressure in the range of about 100 p.s.i. to 15,000 p.s.i. to form an agglomerated product.

References Cited

UNITED STATES PATENTS

| 3,034,848 | 5/1962 | King | 8—79 |
| 3,068,111 | 12/1962 | Seymour | 106—177 |

FOREIGN PATENTS

| 576,100 | 3/1946 | Great Britain. |
| 642,338 | 8/1950 | Great Britain. |

TOBIAS E. LEVOW, Primary Examiner

J. V. HOWARD, Assistant Examiner

U.S. Cl. X.R.

106—308-Q, 309; 8—79, 89